(12) United States Patent
Schulz

(10) Patent No.: US 7,364,654 B2
(45) Date of Patent: Apr. 29, 2008

(54) IN-HOME WATER TREATMENT SYSTEM

(76) Inventor: Christopher Schulz, 20795 E. Fair Pl., Centennial, CO (US) 80016

( * ) Notice: Subject to any disclaimer, the term of this patent is extended or adjusted under 35 U.S.C. 154(b) by 411 days.

(21) Appl. No.: 11/029,857

(22) Filed: Jan. 5, 2005

(65) Prior Publication Data
US 2005/0133459 A1  Jun. 23, 2005

Related U.S. Application Data

(63) Continuation-in-part of application No. 10/743,032, filed on Dec. 23, 2003, now abandoned.

(51) Int. Cl.
*C02F 1/32* (2006.01)
(52) U.S. Cl. ............... 210/198.1; 210/278; 210/279; 210/288; 250/436
(58) Field of Classification Search ............ 210/198.1, 210/192, 243, 277, 288, 290, 748, 190, 191, 210/278, 279; 250/436; 422/24, 186.3
See application file for complete search history.

(56) References Cited

U.S. PATENT DOCUMENTS

| 2,355,808 | A | * | 8/1944 | Lawlor | ............... 427/215 |
| 2,355,815 | A | * | 8/1944 | McGill | ............... 210/277 |
| 3,171,801 | A | * | 3/1965 | Rice et al. | ............... 210/725 |
| 3,923,663 | A | * | 12/1975 | Reid | ............... 210/251 |
| 5,916,439 | A | * | 6/1999 | Oleskow | ............... 210/198.1 |

* cited by examiner

*Primary Examiner*—Matthew O Savage

(57) ABSTRACT

A method and apparatus are provided for a water treatment system that includes both filtration and ultraviolet disinfection elements in a single unit. Various embodiments include a complete treatment system having replaceable filter elements or granular filter media and ultraviolet disinfection within a single vessel. A control valve controls flow through the system in filtering, backwashing, cleaning, and rinsing modes of operation. Other embodiments include couplings that may be adapted to new or existing treatment systems to provide ultraviolet disinfection to a vessel containing replaceable filter elements or granular filter media. The coupling is adapted to receive a control valve assembly that controls flow through the vessel in filtering, backwashing, cleaning, and rinsing modes of operation.

6 Claims, 10 Drawing Sheets

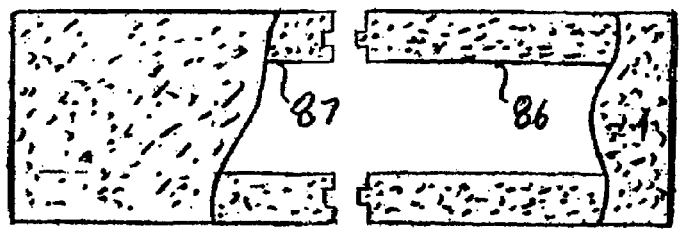
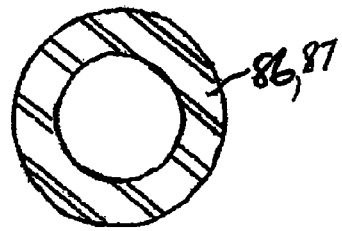
FIG. 10   FIG. 11
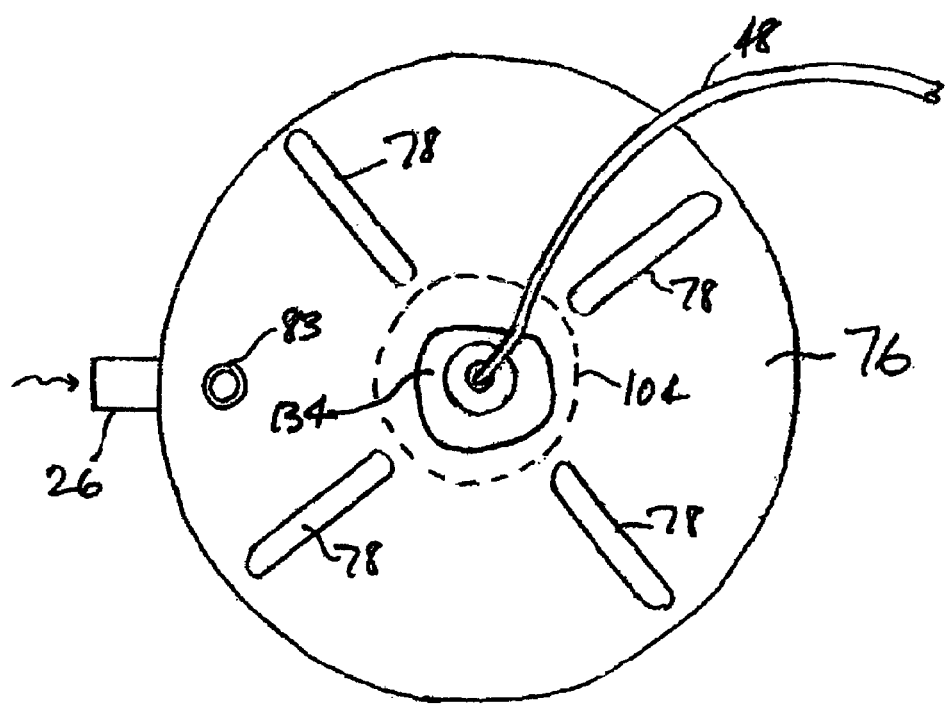
FIG. 12

IN-HOME WATER TREATMENT SYSTEM

RELATED APPLICATIONS

This application is a continuation-in-part of U.S. patent application Ser. No. 10/743,032, filed on Dec. 23, 2003 and titled "In-Home Water Treatment System", now abandoned.

FIELD OF THE INVENTION

The present invention relates to a water filtration and ultraviolet light disinfection apparatus and method that are suitable for use as a point-of-entry or point-of-use water treatment system in the home. More particularly, the present invention relates to an improved home water treatment system and method that provides several water treatment stages in a single vessel for improved water quality, including particulate filtration, inorganic and organic contaminant removal, and microorganism inactivation.

BACKGROUND OF THE INVENTION

Point-of-entry and point-of-use water treatment arrangements for use in homes have been available for some time. Point-of use devices provide localized water treatment at a particular point within the home, such as filters that are attached to faucets. Point-of-entry devices are arranged near the home water-service entry point to provide whole-house water treatment. The point-of-entry devices in common use range from simple particulate filter elements, for filtering larger solid particles that are present in the incoming water, to filter elements that are intended to remove certain chemicals that are present in the incoming water, such as chlorine and organic contaminants. More recently, point-of-entry water treatment units have become available that incorporate ultraviolet lamps for disinfecting the water by exposing it to ultraviolet light in order to inactivate pathogens and other microorganisms that may be present in the incoming water.

Typically, separate treatment units are available for the removal of several undesirable contaminants that may be present in water for household use. It is therefore desirable to provide in a unitary vessel a treatment system for removing particulates and chemicals, and for disinfection of microorganisms. Desirably, such a vessel is of a relatively compact size and is one that is adaptable for retrofitting into existing home water plumbing systems.

SUMMARY OF THE INVENTION

Briefly stated, various embodiments of the present invention relate to a water treatment system that includes both filtration and ultraviolet disinfection elements in a single unit. Various embodiments discussed below include complete treatment systems as well as couplings that may be adapted to new or existing treatment systems to provide ultraviolet disinfection to a vessel containing replaceable filter elements or granular filter media.

In accordance with one embodiment of the present invention, a water treatment system is provided that includes a treatment vessel having an inlet for receiving incoming water from a water source, and having an outlet for discharging treated water. A first filter element carried within the treatment vessel is provided for removing particulates present in the incoming water. A second filter element carried within the treatment vessel is provided for removing chemical compounds present in the incoming water. And an ultraviolet light treatment element carried within the treatment vessel is provided for disinfection of microorganisms present in the incoming water.

In accordance with another embodiment of the present invention, a water treatment system is provided that includes a cylindrical pressure vessel defining an opening at one end of the vessel. A flow transfer tube is centrally positioned within the pressure vessel and extends through the opening in the pressure vessel. A bed of grannular filter media is disposed within the pressure vessel and substantially surrounds at least a portion of the flow transfer tube. An ultraviolet lamp assembly is disposed within the flow transfer tube. A coupling is adapted to receive and retain the flow transfer tube and ultraviolet lamp assembly and sealably engage the opening in the pressure vessel. A flow control valve is mounted on the coupling and is adapted to control water flow through the flow transfer tube and pressure vessel.

BRIEF DESCRIPTION OF THE DRAWINGS

FIG. 10 is a side view, partially broken away, of a carbon cartridge filter of tubular form.

FIG. 11 is an end view of the carbon cartridge filter shown in FIG. 9.

FIG. 12 is a top view of the water treatment vessel shown in FIG. 1.

DESCRIPTION OF THE PREFERRED EMBODIMENTS

Various embodiments of the present invention relate to a water treatment system including both filtration and ultraviolet disinfection elements in a single unit. Various embodiments discussed below include complete systems involving replaceable filter elements or granular media filtration in combination with a UV disinfection element, as well as a specially designed coupling for retrofitting existing pressure filter vessels with a UV disinfection element.

First Embodiment

Replaceable Filter Element/UV Disinfection Treatment System

Figure 1:
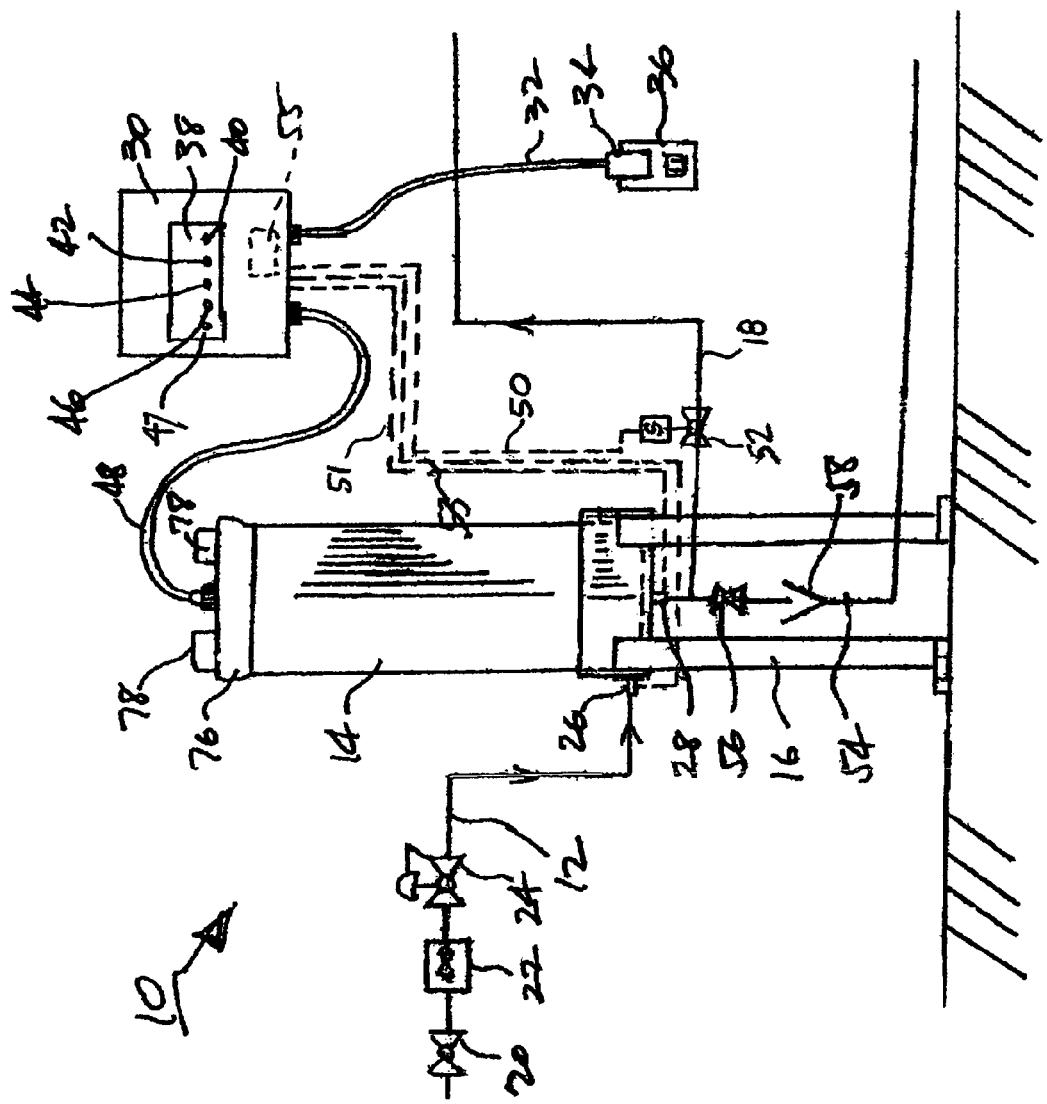
FIG. 1 is a diagrammatic elevational view of one form of an in-home water treatment system in accordance with the present invention.

Referring now to the drawings, and particularly to FIG. 1 thereof, there is shown a schematic elevational view of a water treatment system 10 that can be utilized in a home, at a school, and in other places. The system shown and described herein is particularly suitable in applications in which the maximum water flow rate is of the order of about 12 gallons per minute, or less.

System 10 includes an incoming water supply conduit 12 that is connected with a treatment vessel 14 that can be carried on a stand 16. If desired, treatment vessel 14 can also be wall-mounted, or it can be supported in other ways. Incoming water, such as is commonly supplied by a municipal water source, or derived from a groundwater source such as a well or a spring, enters vessel 14 through supply conduit 12, where it undergoes three treatment stages. The treated water exits from vessel 14 though outlet conduit 18 to be conveyed to the household water distribution system (not shown).

Supply conduit 12 includes a supply shutoff valve 20, and it can also include a flow meter 22 for measuring the rate and amount of water flow. A pressure regulating valve 24 can be provided for controlling the pressure of the water before it enters treatment vessel 14 and the household water system. Flow meter 22 and pressure regulating valve 24 can be positioned downstream of shutoff valve 20 as shown, or one or both of them can be positioned upstream of shutoff valve 20, if desired.

From supply conduit 12 the incoming water enters treatment vessel 14 at vessel inlet 26. The incoming water flows within vessel 12 and through three successive treatment stages, after which treated water exits from vessel 12 at vessel outlet 28 to enter outlet conduit 18 and to be distributed to the various water usage points within the home.

Operation of treatment system 10 is controlled by an electrical control housing 30 that is connected with a standard 120-volt household outlet through a power cord 32. A leakage current interrupter 34 can be provided in power cord 32, or connected with an electrical outlet 36, as a safety measure. Control housing 30 includes a display panel 38 with several suitable switches and indicators. As shown in FIG. 1, display panel 38 includes a system on-off switch 40, a unit-on indicator 42, which can be a visual indicator, such as a light-emitting diode, or the like, and a treatment element replacement indicator 44, which can also be a visual indicator, such as light-emitting diode, or the like, to show the need for treatment element replacement. Additionally, control housing 30 can include a clock (not shown) to monitor the treatment system operating time, and a clock reset button 46 to reset the clock after the replacement of a water treatment element within treatment vessel 14.

Control housing 30 also includes a power cable 48 to deliver electrical power to treatment vessel 14, an electrical conduit 50 that is connected with a solenoid-operated valve 52 in outlet conduit 18, and pressure conduits 51, 53 that are connected to a differential pressure switch 55 within control housing 30. Valve 52 can be arranged, through suitable control circuitry (not shown), to stop the flow of water from treatment vessel 14 to the household water system in the event of a treatment system malfunction, or in the event of a failure to timely replace a water treatment element that is contained within treatment vessel 14. Differential pressure switch 55 is utilized to activate visual indicator 47 when a set point differential pressure across the treatment system is exceeded, which indicates that first filter element 84 is clogged with accumulated particulate matter, such as sediment, and requires cleaning or replacement.

In addition to its connection with the household water distribution system, vessel outlet 28 is adapted to communicate with a drain conduit 54 in which a manually operable drain valve 56 is provided to allow or to prevent the flow of water from treatment vessel 14 into drain conduit 54, such as through a drain receptacle 58.

Figure 2:
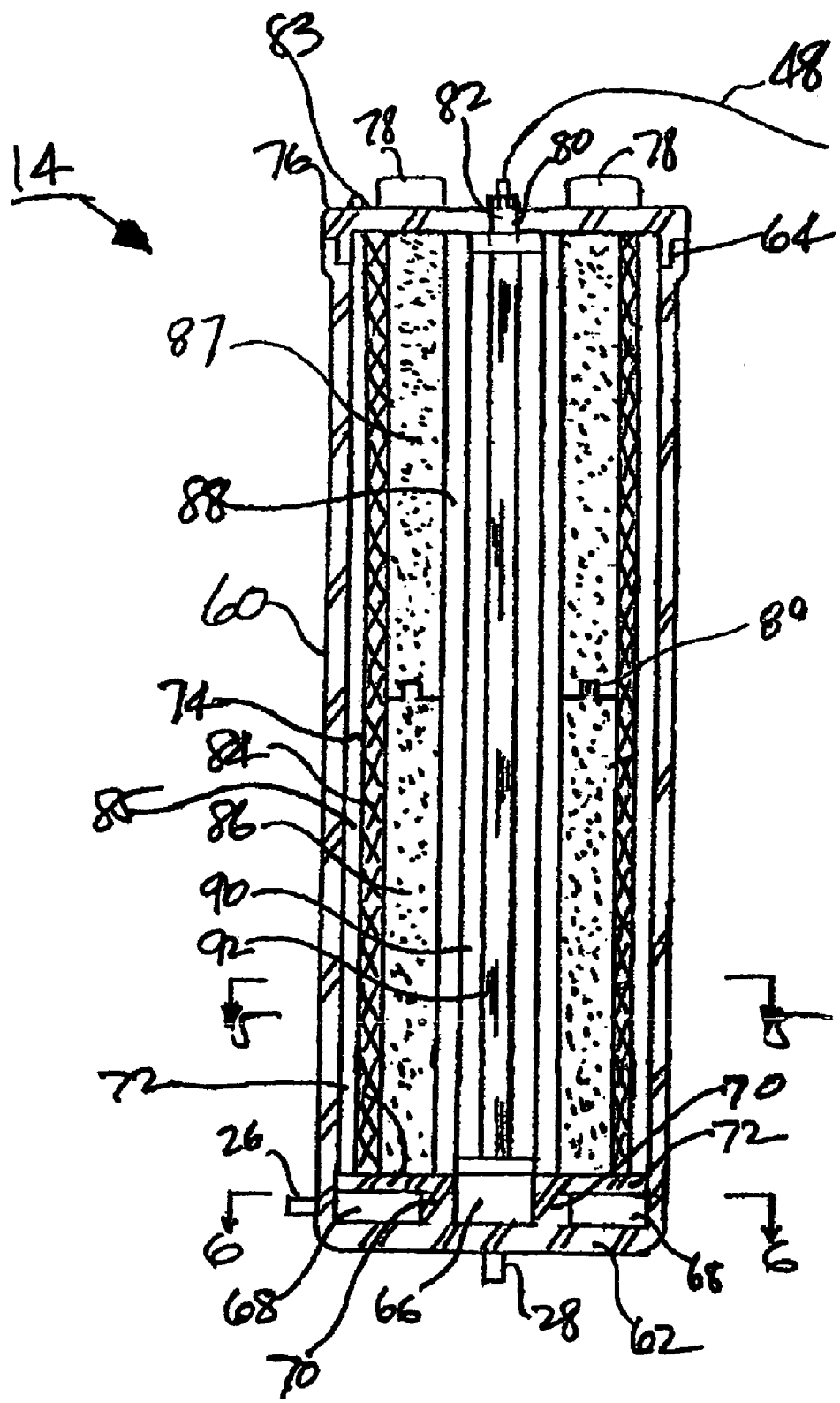
FIG. 2 is a longitudinal cross-sectional view of a water treatment vessel forming part of the system shown in FIG. 1.

Treatment vessel 14 and its interior elements and structure are shown in longitudinal cross-sectional form in FIG. 2. Vessel 14 is a generally tubular housing and can be of cylindrical form, as shown in the drawings. Advantageously, from cost and simplicity of manufacture standpoints, treatment vessel 14 can be an injection-molded structure that can be formed from polypropylene, ABS, polycarbonate, or other polymeric materials suitable for use in pressurized potable water systems. Treatment vessel 14 is defined by an annular vessel sidewall 60, by a disk-like, closed vessel bottom wall 62, and by a vessel top opening 64. Vessel bottom wall 62 includes vessel outlet 28, which is located at a generally axial position, relative to vessel sidewall 60, and which communicates with an outlet plenum chamber 66 that serves as a treated water collection well. Vessel inlet 26 is spaced above vessel bottom wall 62 and communicates with an annular inlet plenum chamber 68. Outlet plenum chamber 66 is separated from inlet plenum chamber 68 by an axially-extending annular separator wall 70 that extends upwardly from vessel bottom wall 62 to a radially extending divider wall 72 that separates inlet plenum chamber 68 from vessel inner chamber 74.

Figure 4:
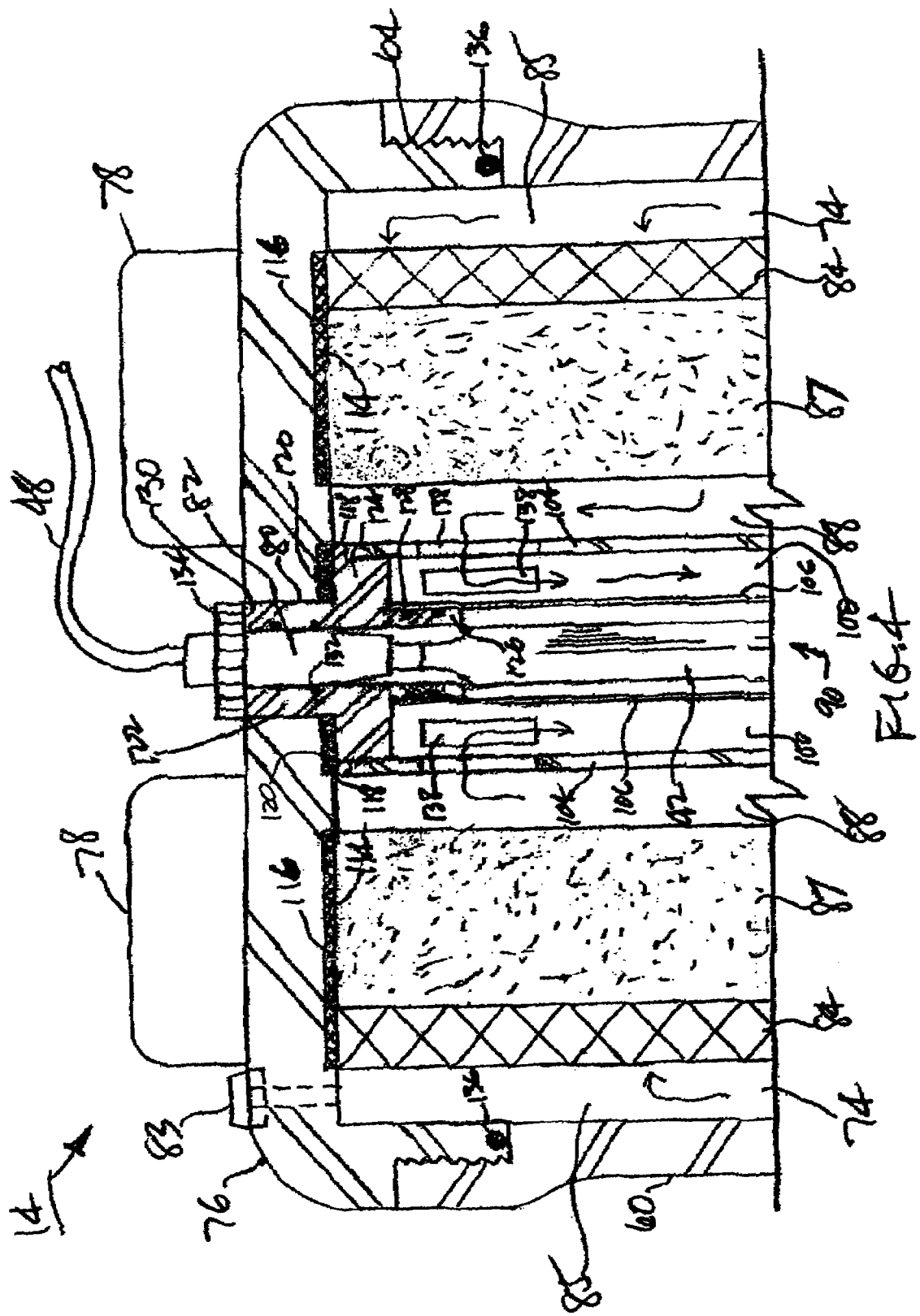
FIG. 4 is an enlarged, fragmentary cross-sectional view adjacent the top region of the water treatment vessel shown in FIG. 2.

Vessel top opening 64 is closed by a top end cap 76 that can be removably connected with the upper end of vessel sidewall 60, such as by a threaded connection, as shown in FIG. 4. Top end cap 76 includes several radially extending, circumferentially-spaced projections that serve as twist-off handles, to allow convenient attachment and removal of top end cap 76 from vessel 14, as necessary. Top end cap 76 also includes a centrally-positioned opening 80 to receive a power cable connector 82, and a pressure relief valve 83.

Positioned axially within vessel inner chamber 74 and spaced inwardly of the interior surface of vessel sidewall 60 is a first filter element 84. Element 84 is in the form of a relatively thin wall, semi-rigid, annular filter pad for filtering sediment and other particulate matter contained in the incoming water to be treated. The radial spacing between vessel sidewall 60 and the outer surface of first filter element 84 defines an outer annular flow channel 85 and can be of the order of from about ¼ to about ½ inch, to allow axial flow of incoming water along the outer periphery of first filter element 84, and to thereby expose incoming water to a relatively large surface area through which the incoming water can flow radially inwardly toward the center of treatment vessel 14. The radial thickness of first filter element 84 can be of the order of from about ¼ inch to about ¾ inch, depending upon the porosity of the material that is utilized to form that filter element and the desired cleaning frequency of the filter element. In that regard, first filter element 84 is capable of filtering from the incoming water particulate matter having a particle size of about 5 microns or larger.

Second filter elements 86, 87 are positioned axially within first filter element 84 and can also be of annular form.

Second filter elements 86, 87 are rigid, porous carbon block filters for removing from the incoming water that passes therethrough such chemical contaminants as chlorine, chlorinated by-products, and other inorganic and organic compounds that can adversely affect the taste and odor of the water that is to be treated. The radial thickness of each of second filter elements 86, 87 is greater than that of first filter element 84 to provide adequate contact time for adsorption of organic contaminants from the water typically from about ¾ inch to about 1 inch.

For larger treatment vessels, such as is shown in FIG. 2, two axially-aligned second filter elements 86, 87 can be provided to facilitate removal and replacement of the second filter elements when necessary during use of the apparatus. A key-notch-type orientation arrangement 89 can be provided at the lower end of uppermost filter element 87 and at the top end of lowermost filter element 86 to ensure proper alignment of the second filter elements 86, 87 when they are installed within treatment vessel 14.

Positioned axially within second filter elements 86, 87, and spaced radially inwardly thereof to define an inner annular flow channel 88 therebetween, is a third water treatment element 90. Treatment element 90 is in the form of an ultraviolet light treatment reactor for disinfection treatment of the water by exposure of the water to ultraviolet light in order to inactivate microorganisms that may be present within the incoming water. Treatment element 90 includes an ultraviolet lamp 92 that is axially positioned within vessel 14 and is spaced inwardly from and concentric with each of first filter element 84 and second filter elements 86, 87. The ultraviolet light provided by treatment element 90 serves to inactivate pathogenic microorganisms, such as *Cryptosporidium, Giardia*, bacteria, viruses, and the like, and it avoids the need to use hazardous disinfection chemicals that can produce undesired residual chemical compounds or possibly hazardous byproducts. Treatment element 90 is adapted to provide ultraviolet radiation at wavelengths of about 254 nanometers and can be a standard, low-pressure ultraviolet lamp, for which effective light-based disinfection of waterborne microorganisms can take place. The space between the outer surface of treatment element 90 and the inner surfaces of second filter elements 86, 87 defines inner annular flow channel 88, which serves to allow water that has passed through first filter element 84 and second filter elements 86, 87, and that has been filtered to remove particulates and undesirable chemical compounds, to flow coaxially along the outer surface of treatment element 90 for the final treatment step, which involves inactivation of microorganisms in the water.

Figure 3:
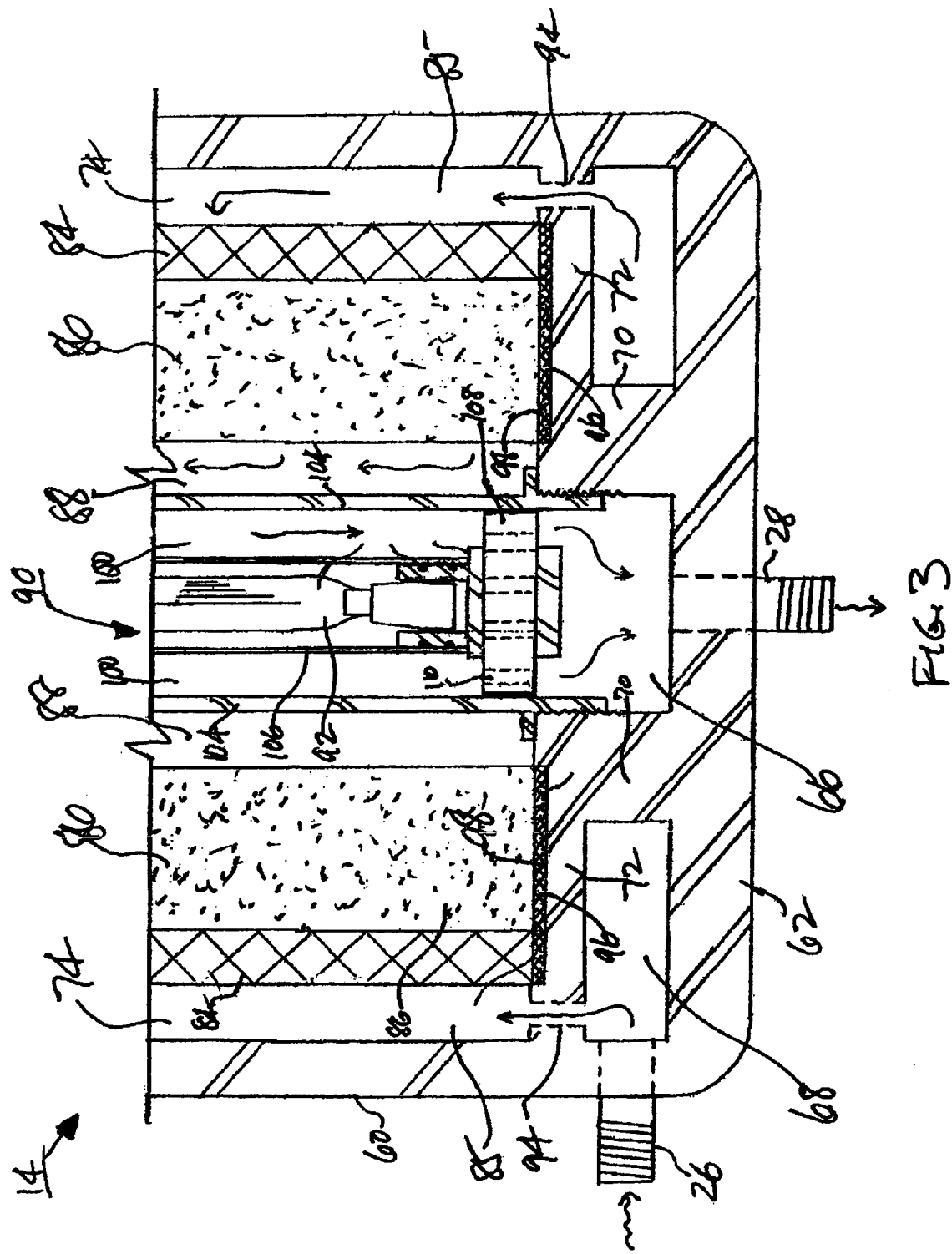
FIG. 3 is an enlarged, fragmentary cross-sectional view adjacent the base region of the water treatment vessel shown in FIG. 2.

The structure of vessel 14 and the arrangement of the several treatment elements positioned therewithin are shown in greater detail in FIGS. 3 and 4, which are enlarged, fragmentary, cross-sectional views of the several treatment elements, as well as the vessel structure at the bottom and at the top regions, respectively, of vessel 14. Referring first to FIG. 3, the base portion of vessel 14 includes annular inlet plenum chamber 68 that is bounded by vessel bottom wall 62, by radially-extending divider wall 72 that is spaced axially from bottom wall 62, by axially-extending separator wall 70 that extends between bottom wall 62 and divider wall 72, and by vessel sidewall 60. Inlet plenum chamber 68 communicates with inlet connection 26 to receive the water to be treated, and it serves to distribute the incoming water circumferentially within the interior of vessel 14. In that regard, a plurality of substantially axially-extending, circumferentially-spaced openings 94 are provided in divider wall 72 adjacent vessel sidewall 60 to provide communication between inlet plenum chamber 68 and outer annular flow channel 85. The number, spacing, and size of openings 94 are selected to provide the desired flow rate and flow distribution into the treatment section of vessel 14 of the incoming water that is to be treated.

Divider wall 72 within vessel 14 includes an annular recess 96 in its upper surface to receive a flexible, annular seating ring 98 against which rest the lower end surfaces of each of first filter element 84 and second fitter elements 86, 87. Sealing ring 98 can be made from neoprene rubber, or the like, and it serves to prevent water flow around the lower ends of the first and second filter elements so that the water is confined to flow through the respective elements rather than bypassing them.

Separator wall 70 within vessel 14 is so sized and positioned as to provide a desired volume for outlet plenum chamber 66, which communicates both with outlet connection 28 and with an inner annular flow channel 100 outside third treatment element 90. Separator wall 70 can be formed with an internal thread, which is adapted to threadedly receive an end of a tubular housing 104 of cylindrical form that forms part of third treatment element 90. Housing 104 can be made from stainless steel, or the like, and serves to define the interior surface of intermediate annular flow channel 88 and the outer surface of inner annular flow channel 100.

Axially positioned within housing 104 is tubular ultraviolet lamp 92 that is surrounded by a protective tubular quartz glass sleeve 106, which is capable of transmitting ultraviolet light with minimal absorbance. Sleeve 106 has an outer diameter that is smaller than the inner diameter of housing 104 to define therebetween inner annular flow channel 100, through which the water to be treated flows in an axial direction toward outlet plenum 66. The lowermost end of sleeve 106 carries an annular centralizer ring 108, which extends between housing 104 and sleeve 106 to position lamp 92 centrally within housing 104. Centralizer ring 108 need not be fixed to housing 104, but can be so sized as to provide a snug fit therewith, to allow centralizer ring 108 to slide along the inner surface of housing 104 to facilitate removal of treatment element 90. Centralizer ring 108 includes a plurality of axially-extending openings 110 to allow water to flow from within inner annular flow channel 100 into outlet plenum 66. The number, spacing, and size of openings 110 are selected to control the flow rate and the flow distribution of the water within inner annular flow channel 100 into outlet plenum 66, to achieve a desired exposure time of the water to ultraviolet light.

FIG. 4 shows in cross section the upper interior portion of vessel 14. The upper ends of each of first filter element 84 and second filter elements 86, 87 are retained against a flat, annular sealing ring 114 similar to sealing ring 98. Sealing ring 114, which can be made from neoprene rubber, or the like, is received in a correspondingly-shaped annular recess 116 formed in the lower surface of top end cap 76. Sealing ring 114 serves to prevent water flow around the upper ends of first filter element 84 and second filter elements 86, 87, so that the water to be treated is confined to flow from outer flow channel 85 into and through each of the first and second filter elements to intermediate flow channel 88, rather than bypassing the filter elements. Positioned radially inwardly of ring 114, and coaxial therewith, is an inner sealing ring 118 that is received within annular recess 120 formed in top end cap 76. Inner sealing ring 118 is adapted to provide a seal between annular top end connector 122, which includes an annular body member 124 that is threadedly received at the upper end of tubular housing 104. Sealing ring 118 serves to prevent water flow between the upper end of tubular housing 104, top end connector 122, and top end cap 76. Connector 122 includes a downwardly-extending, coaxial sleeve 126 that carries on its outer surface a pair of O-rings 128 to sealingly engage with the upper inner surface of tubular sleeve 106, and an upwardly-extending, coaxial sleeve 130 that carries on its inner surface a pair of O-rings 132 to sealingly engage with ultraviolet lamp cable connector 82 that extends from ultraviolet lamp 92. Cable connector 82 is retained by an end fastener 134 that threadedly engages with cable connector 82 and top end connector 122 and that abuts the upper outer surface of top end cap 76. The ultraviolet lamp assembly, which includes cable connector 82 and ultraviolet lamp 92, can be removed from treatment element 90 by disengaging end fasteners 134 and lifting out the lamp assembly through the opening in top end connector 122.

Top end cap 76 is threadedly received at the uppermost end of vessel 14. An O-ring 136 provides a seal between vessel sidewall 60 and end cap 76 to prevent water leakage therebetween. A positive, water-tight seal is also provided between top end cap 76 and each of first filter element 84 and second filter element 86, 87 by sealing ring 114 and between top end cap 76 and top end connector 122 by inner sealing ring 118. Each of sealing rings 114 and 118 is at least partially compressed when top end cap 76 is tightened against the upper end of vessel sidewall 60. Top end cap 76 also includes a central opening to coaxially receive annular sleeve 130 of top end connector 122. The disclosed structural arrangement allows top end cap to be threadedly engaged with or disengaged from vessel sidewall 60 while top end connector 122 remains stationary and secured to tubular housing 104 of third treatment element 90.

Visible in FIG. 4 are axial projections 78 that are provided to facilitate attachment to and removal from vessel 14 of end cap 76 for access to the filters and ultraviolet lamp for servicing purposes. Additionally, pressure relief valve 83 is provided in top end cap 76 to allow bleedoff of air that is trapped within vessel 14 after the application of top end cap 76, and also to allow depressurization of the interior of vessel 14 after incoming water flow has been shut off, at a time when access to the treatment elements contained within vessel 14 is desired.

FIG. 4 also shows positioned at an end of tubular housing 104 a plurality of axially-elongated, circumferentially-spaced, openings in the form of slot-like passageways 138 to allow flow of filtered water from intermediate annular flow channel 88 into inner annular flow channel 100 to allow exposure of the filtered water to ultraviolet light for the third, disinfection stage of treatment. Passageways 138 are positioned adjacent the uppermost end of tubular housing 104 to cause the filtered water to enter inner annular flow channel 100 at its uppermost end and to flow axially substantially completely along quartz sleeve 106 for an extended exposure time of the water to ultraviolet light that emanates from lamp 92 for improved disinfection.

Figure 5:
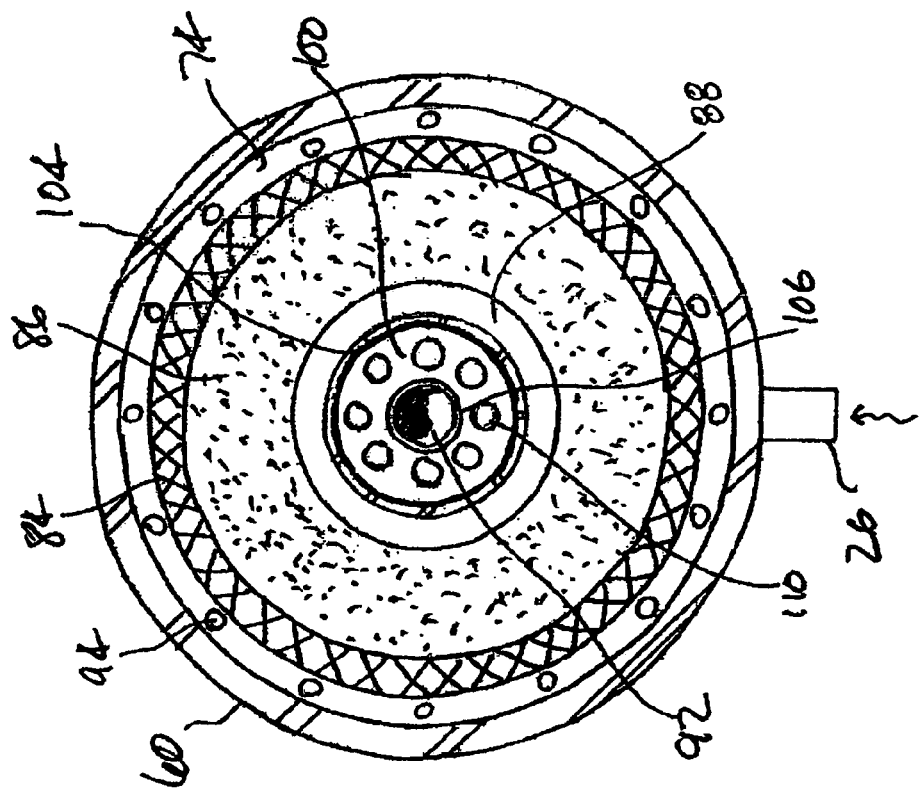
FIG. 5 is a cross-sectional view taken along the line 5-5 of FIG. 2.

FIG. 5 is a cross-sectional view through vessel 14 adjacent to the lower end thereof to show the internal arrangement of the first and second filter elements 84, 86 and the third, disinfection element 90 including ultraviolet lamp 92. Also shown are outer annular flow channel 74, into which incoming water to be treated passes from inlet connection 26, along with openings 94 in divider wall 7; intermediate annular flow channel 88 between second filter elements 86, 87 and tubular housing 104; and inner annular flow channel 100, along with openings 110 that lead into outlet plenum 66.

Figure 6:
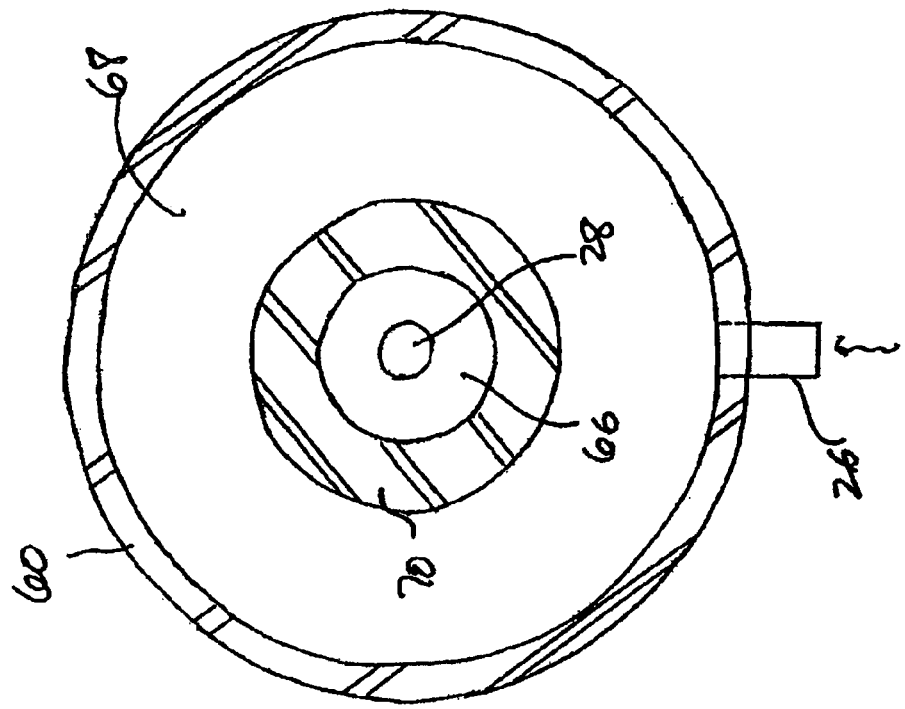
FIG. 6 is a cross-sectional view taken along the line 6-6 of FIG. 2.

FIG. 6 is a cross-sectional view through vessel 14 between bottom wall 62 and divider wall 72. As shown, inlet plenum 68 is of annular form and is separated from cylindrically-shaped outlet plenum 66 by axially-extending separator wall 70.

Figure 7:
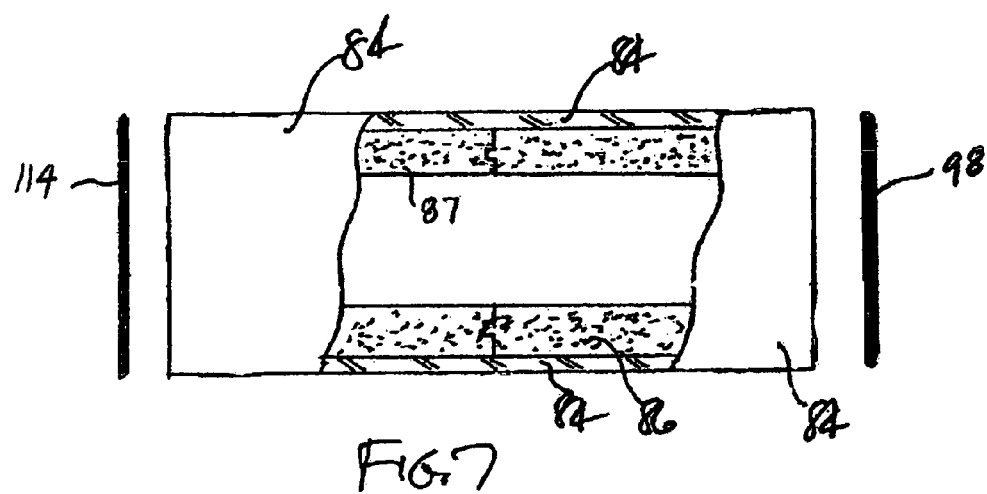
FIG. 7 is a side view of a two-stage filter assembly, partially broken away to show the internal structure.
Figure 8:
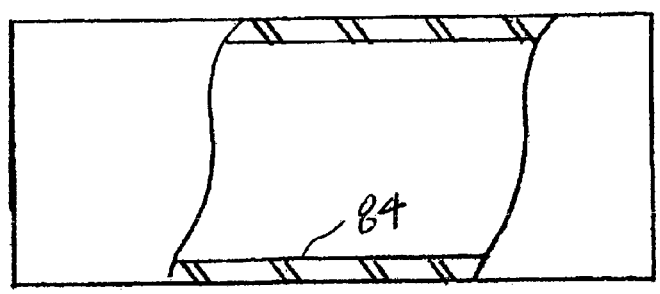
FIG. 8 is a side view of a particulate filter pad of tubular form.
Figure 9:
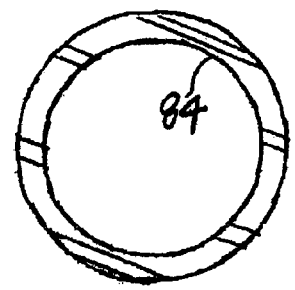
FIG. 9 is an end view of the filter pad of FIG. 8.

FIG. 7 is a side view, partially broken away, showing first filter element 84 and second filter elements 86, 87 in assembled form to provide a unitary, tubular filter structure. Inner, second filter elements 86, 87 are surrounded by first filter element 84, which is a semi-rigid, cylindrical filter pad formed from spun fibers. Tubular first filter element 84 is shown in a side view in FIG. 8 and in an end view in FIG. 9.

Second filter elements 86, 87 are shown in FIG. 10 in a side view, partially broken away, and in an end view in FIG. 11. As is apparent from FIGS. 8 through 11, first filter element 84 and second filter elements 86, 87 each have a tubular structure. First filter element 84 is placed around and in contact with the outer surfaces of each of second filter elements 86, 87, providing a snug fit therebetween and assuring proper coaxial alignment of each of the second filter elements 86, 87.

FIG. 12 shows a top view of vessel 14. In addition to top end cap 76, also shown in FIG. 12 are the four axial projections 78 that extend upwardly from top end cap 76 and that define twist-off handles to allow removal of top end cap 76 from vessel 14 for servicing of the interior components that are housed within vessel 14. Also shown is power cable 48 for supplying electrical power to the ultraviolet lamp.

In the operation of the above-described disinfection system, only periodic monitoring of control panel 30 is needed to determine whether the filter elements and ultraviolet lamp need replacement. Generally, for a typical home system that is sized for a maximum flow rate of about 12 gallons per minute and an average flow rate of about 4 gallons per minute, only annual carbon filter and lamp replacement is anticipated. The outer, particulate filter may require more frequent cleaning or replacement, depending upon the quality of the water being treated and the volume of water usage. The standard, low-pressure ultraviolet lamp generally operates at about 60° C. and therefore will not overheat. It can remain on continuously, even if no flow takes place over a number of days or weeks.

Second Embodiment

Granular Media Filter/UV Disinfection Treatment System

Figure 13:
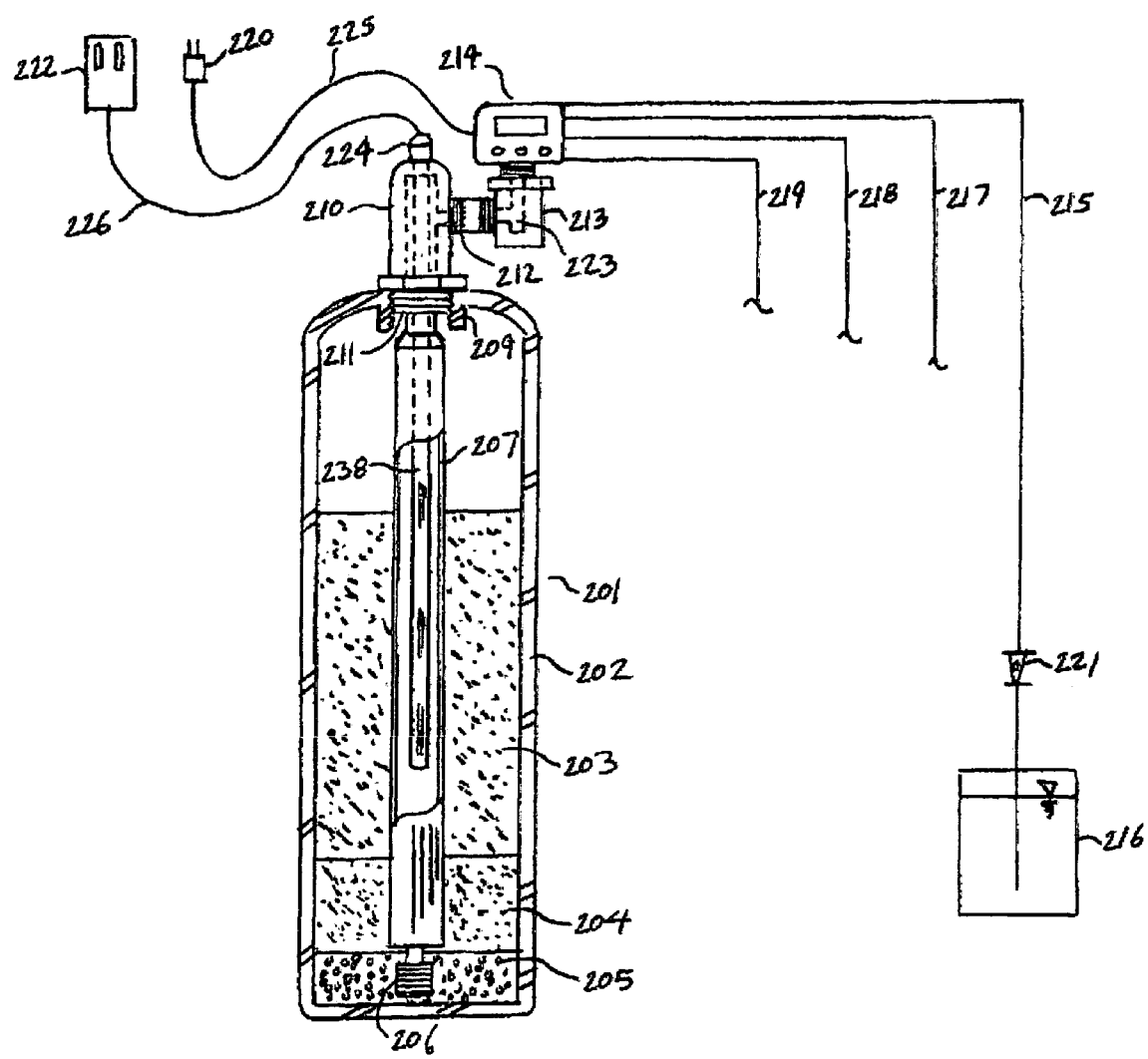
FIG. 13 is a cross-sectional side view of a treatment system according to an alternative embodiment of the present invention.

FIG. 13 is a cross-sectional side view with elements shown in phantom of a treatment system according to an alternative embodiment of the present invention. In this example the treatment system 201 includes a vertical cylindrical pressure vessel 202 such as those commonly used in point-of-entry home water treatment systems. The pressure vessel 202 may be constructed of any suitable material such as polyglass, fiberglass, or other materials commonly used to construct such vessels. The vessel 202 defines a top opening 209 at one end of the vessel 202.

Also as shown here, the top opening 209 in the vessel 202 may be threaded to accept a threaded end 211 of a coupling 210 through which water may be supplied to and drawn from the vessel 202. Alternatively, the coupling 210 may be attached to and seal the vessel 202 by other means such as a bolted flange and gasket. Generally, the coupling 210 directs water flow into and out of the vessel 202. Additional details of the coupling 210 will be discussed below.

Figure 14:
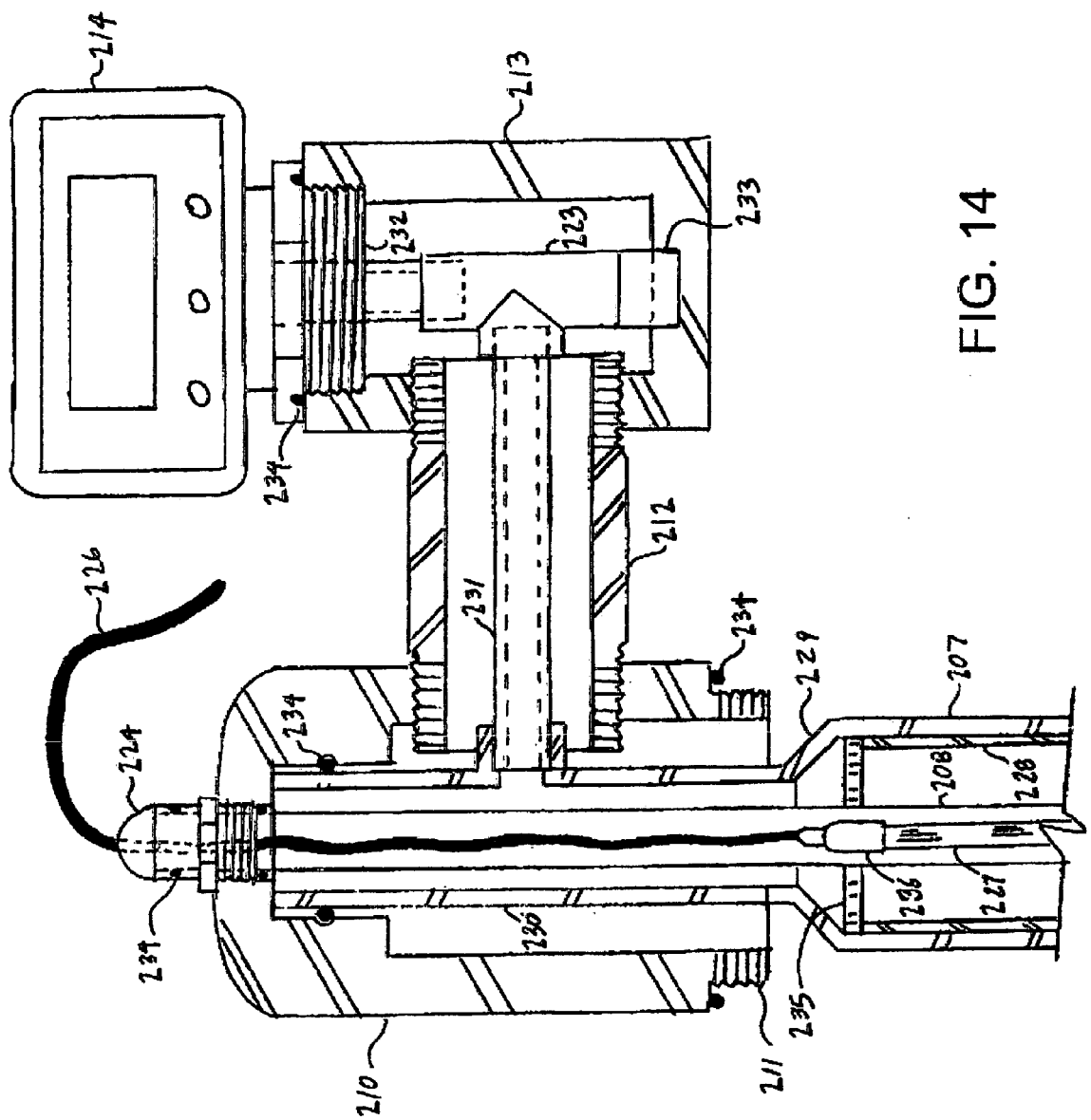
FIG. 14 is a cross-sectional side view of a coupling for a treatment system according to the embodiment illustrated in FIG. 13.

A flow transfer tube 207 is centrally positioned within the pressure vessel 202. The flow transfer tube 207 extends through the top opening 209 and into the pressure vessel 202. The top end of the flow transfer tube 207 is connected with the coupling 210 and, through the coupling 210, provides a path for water flow into or out of the vessel 202. Additional details of the flow transfer tube 207 connection with the coupling 210 are shown in FIG. 14 and will be discussed below.

A bed of filter media 203, 204, and 205 is located within the pressure vessel 202 and substantially surrounds at least a portion of the flow transfer tube 207. The top of the filter bed is spaced below the top of the pressure vessel to provide adequate clearance for expanding the bed during a backwash cycle, as will be discussed later. The bed of filter media 203, 204, and 205 may comprise multiple layers (as shown here) or a single layer and is provided to remove suspended or dissolved contaminants from the water. For example, the filter media may comprise a support gravel 205 and a top layer 203 and a bottom layer 204. The various layers may be made up of a variety of different types of filter media commonly used in filtration systems. For example, the filter media may comprise sand or anthracite of approximately 0.5 to 1.0 millimeters effective size to remove suspended solids or oxidized iron and manganese precipitates. The filter media may also comprise granulated activated carbon of approximately 0.5 to 1.0 millimeters effective size to remove chlorine, chloramines or taste and odor compounds by adsorption. In other cases the filter media may comprise an iron-based media such as granular ferric hydroxide to remove arsenic from the water. Alternatively, the filter media may comprise an ion exchange resin to remove calcium and/or magnesium hardness from the water. These and other types of filter media may be used in combination when multiple layers are used in the bed of filter media 203, 204, and 205. For example, the top layer 203 may comprise granulated activated carbon of approximately 0.5 to 1.0 millimeters effective size for chlorine and taste and odor removal while the bottom layer may comprise a manganese-oxide coated media of approximately 0.5 to 1.0 millimeters effective size for iron and manganese removal. The exact type(s) of filter media for a particular application should be based on specific water quality and treatment requirements.

The water treatment system 201 further comprises a filter media retainer 206. The filter media retainer 206 sealably engages the bottom end of the flow transfer tube 207. The filter media retainer 206 is adapted to prevent filter media from entering the flow transfer tube 207 and may comprise a screen with narrow slotted apertures or similar type of system.

An ultraviolet lamp assembly 238 is disposed within the flow transfer tube 207. The ultraviolet lamp assembly 238 provides a disinfection treatment stage following filtration within the pressure vessel 202. The ultraviolet lamp assembly 238, as will be discussed further below, comprises a low-pressure germicidal lamp housed inside a closed-end quartz sleeve 208. The bottom end of the ultraviolet lamp assembly 238 extends into the flow transfer tube 207 while the top end of the ultraviolet lamp assembly 238 is secured within the coupling 210. A lamp end connector 224 located on the top of the coupling 210 is threadably received into coupling 210 with O-ring seals to provide a watertight seal. A power cord 226 passes through an opening in end connector 224 and is connected to lamp end connector 236. The other end of power cord 226 is connected to lamp power supply plug 222. Lamp power supply plug 222 may contain a lighting ballast for igniting the lamp. Additional details of the structure and function of the coupling 210, flow transfer tube 207, and ultraviolet lamp assembly 238 will be discussed below with reference to FIG. 14.

The water treatment system 201 may further comprise a control valve assembly 214 connected to the coupling 210 via a pipe fitting 212. The control valve assembly 214 may be any of a variety of manually or automatically operated commercially available units and can include inlet, outlet, drain, and possibly chemical feed connections for operation of water treatment system 201. In addition, an automatically operated control valve assembly 214 may include a microprocessor and timer to control the frequency and duration of filter, backwash, and possibly, chemical cleaning and rinse cycles. For example, some automatically operated units that may be suitable include the Autotrol unit by GE Osmonics, Fleck 5600 by Pentair Water Corporation, and the WS1 by Clack Corporation.

The control valve assembly 214 communicates with coupling 210 via pipe fitting 212, coupling interconnect pipe 223, and control valve receptacle 213 and may be adapted to alternately flow untreated water to the water treatment system 201 via a supply line 217, supply the home with treated water via an output line 218 and drain the system 201 via a drain line 219. The control valve assembly 214 may be adapted to be manually or automatically operated based on time, flow, or other criteria. In some cases, the treatment system 201 may also include a cleaning solution or chemical reagent container 216 coupled with the control valve assembly 214 via cleaning solution or chemical reagent tubing 215 and check valve 221. In the case of an automatically operated control valve assembly 214, the control valve assembly 214 may be connected with an electrical outlet via control valve power cord 225 and control valve electrical plug 220. Operation of the treatment system 201 and the water flow therethrough will be discussed in detail below after further discussion of the details of the coupling 210.

FIG. 14 is a cross-sectional side view with elements shown in phantom of a coupling for a treatment system according to the embodiment illustrated in FIG. 13. In this example, a coupling 210 for a cylindrical pressure vessel 202 of a water treatment system 201 is shown in detail. The coupling body is adapted to sealably engage the opening in the pressure vessel 202 via a threaded end 211 and O-ring 234. Alternatively, other means may be used to couple and seal the coupling 210 to the vessel 202 such as a bolted flange and gasket connection.

The coupling body defines a cylindrical cavity extending from the bottom end of the coupling body and engaging the opening in the pressure vessel 202. The cylindrical cavity extends from the bottom of the coupling 210 upwards, into the coupling. An annular opening into the cylindrical cavity is defined at the top end of the coupling body. The coupling 210 also has an annular opening in a side (the right side from this perspective) of the coupling body into the cylindrical cavity.

The flow transfer tube 207 sealably engages the coupling body in the cylindrical cavity around the annular opening into the cylindrical cavity at the top end of the coupling body. As shown here, the flow transfer tube 207 is coupled with a reducer fitting 229 to a narrow, extended top end 230. Alternatively, the flow transfer tube 207 may extend directly to the top of the coupling 210 if the coupling 210 can be sized large enough to accept the full diameter of the extended flow transfer tube 207. The top of the flow transfer tube 207 is sealed in the coupling via O-ring 234 or other similar means.

The extended top end 230 of flow transfer tube 207 further defines an annular opening in a side (the right side from this perspective) near the top end of tube 207 inside the cylindrical cavity of the coupling body. A pipe fitting 212 sealably engages the annular opening in the side of the coupling 210. A connector pipe 231 extends through pipe fitting 212 and sealably engaging the annular opening in the side of the extended top end 230 of flow transfer tube 207.

The ultraviolet lamp assembly 238 is disposed within the flow transfer tube 207 and sealably engages the annular opening in the top end of the coupling 210. The ultraviolet lamp assembly 238 comprises a transparent quartz lamp sleeve 208 surrounding an ultraviolet lamp 227. One or more centralizer screens 235 may be disposed within the flow transfer tube 207. The centralizer screen 235 defines a central opening adapted to slidably receive the ultraviolet lamp assembly 238 and position and laterally support the ultraviolet lamp assembly 238 within the flow transfer tube 207. The ultraviolet lamp 227 may be electrically coupled with power cord 226 via an end connector 236. The power cord 226 may pass through the ultraviolet lamp assembly 238 and through the coupling 210 via connector 224. Connector 224 and the top end of lamp sleeve 208 may be sealed to the coupling 210 via one or more O-rings 234 or other means to provide a watertight seal and prevent any water leakage into lamp sleeve 208, which could damage UV lamp 227. Additionally, the ultraviolet lamp 227 may be removed from treatment system 201 by depressurizing treatment system 201, unfastening the top end of connector 224 and pulling power cord 226 which is connected to end connection 236 of UV lamp 227.

The flow transfer tube may be made of a variety of materials suitable to support the structures described herein and contain the pressure likely to be applied to the treatment system 201. For example, because of its low cost, polyvinylchloride (PVC) pipe may be commonly used to construct the flow transfer tube 207. However, since PVC is degraded by ultraviolet light, a thin stainless steel tube insert 228 may be placed into the inside of the flow transfer tube 207 to prevent the ultraviolet lamp 227 from excessively degrading the flow transfer tube 207. Alternatively, flow transfer tube 207 may be constructed of material that is not subject to deterioration by exposure to ultraviolet light such as copper or stainless steel.

The control valve assembly 214 is coupled with pipe fitting 212 via control valve receptacle 213. The control valve assembly 214 is adapted to flow untreated water through the water treatment system 201. Further, the control valve assembly 214 controls the flow of water through the treatment system 201 for different operational cycles including filtering, backwash, chemical cleaning, and rinse cycles.

In operation, pressurized, untreated water is supplied to treatment system 201 from the home's plumbing system 217 to the control valve assembly 214. In the typical filtering mode, the control valve assembly 214 directs water through the control valve receptacle 213 to the fitting 212. From the fitting 212, untreated water flows through the coupling 210, round the outside of the flow transfer tube 207 into the pressure vessel 202. Once in the pressure vessel 202, the untreated water flows through the filter media and into the end of the flow transfer tube 207 through filter media retainer 206. The water then flows up through the flow transfer tube 207 around the ultraviolet lamp assembly 238 and into the top of the flow transfer tube 230. From the top of the flow transfer tube 230, water flows through the connector pipe 231, through the interconnection pipe 223 and control valve assembly 214 to the supply line 218 of the home's plumbing.

Since the filter media may require periodic cleaning to prevent clogging of the filter media, a backwash cycle is provided to reverse flow through the system and clean the filter media. In a backwash cycle, the control valve assembly 214 switches to direct, untreated water from supply line 217 through the interconnection pipe 223 to the connector pipe 231. From the connector pipe 231, water flows into the top extension 230 of flow transfer tube 207, around the ultraviolet lamp assembly 238, and down the flow transfer tube 207. The water flows out of filter media retainer 206 at the bottom of flow transfer tube 207, into and up through the filter media, and out of the pressure vessel 202 through the coupling 210. From the coupling 210, water flows around the top of the flow transfer tube 230 and into the fitting 212. From the fitting 212, water flows around the connector pipe 231 into the control valve receptacle 213 and out of the control valve assembly 214 to a drain line 219 of the home's plumbing.

Further cleaning of the system may be accomplished periodically, if necessary, using a chemical cleaning cycle. In a chemical cleaning cycle, the control valve assembly 214 directs untreated water from the supply line 217 and uses a venturi injector device to pull-in chemical cleaning solution from cleaning solution or chemical reagent container 216 through cleaning solution or chemical reagent tubing 215 through the interconnection pipe 223 to the connector pipe 231. From the connector pipe 231, water flows into the top of the flow transfer tube 230, around the ultraviolet lamp assembly 238, and down the flow transfer tube 207. The water flows out of filter media retainer 206 at the bottom of flow transfer tube 207, into and up through the filter media, and out of the pressure vessel 202 through the coupling 210. From the coupling 210, water flows around the top of the flow transfer tube 230 and into the fitting 212. From the fitting 212, water flows around the connector pipe 231 into the control valve receptacle 213 and out of the control valve assembly 214 to a drain line 219 of the home's plumbing. Typically, such a chemical cleaning cycle may be followed by a rinse cycle.

In a rinse cycle, the control valve assembly 214 directs untreated water from the home's plumbing system 217 to the control valve assembly 214. The control valve assembly 214 directs water through the control valve receptacle 213 to the fitting 212. From the fitting 212, untreated water flows through the coupling 210, round the outside of the flow transfer tube 207 into the pressure vessel 202. Once in the pressure vessel 202 the untreated water flows through the filter media and into the end of the flow transfer tube 207. The water then flows into filter media retainer 206, up through the flow transfer tube 207 around the ultraviolet lamp assembly 238, and into the top of the flow transfer tube 230. From the top of the flow transfer tube 230, water flows through the connector pipe 231, through the interconnection pipe 223 and control valve assembly 214 to a drain line 219 of the home's plumbing.

Figure 15:
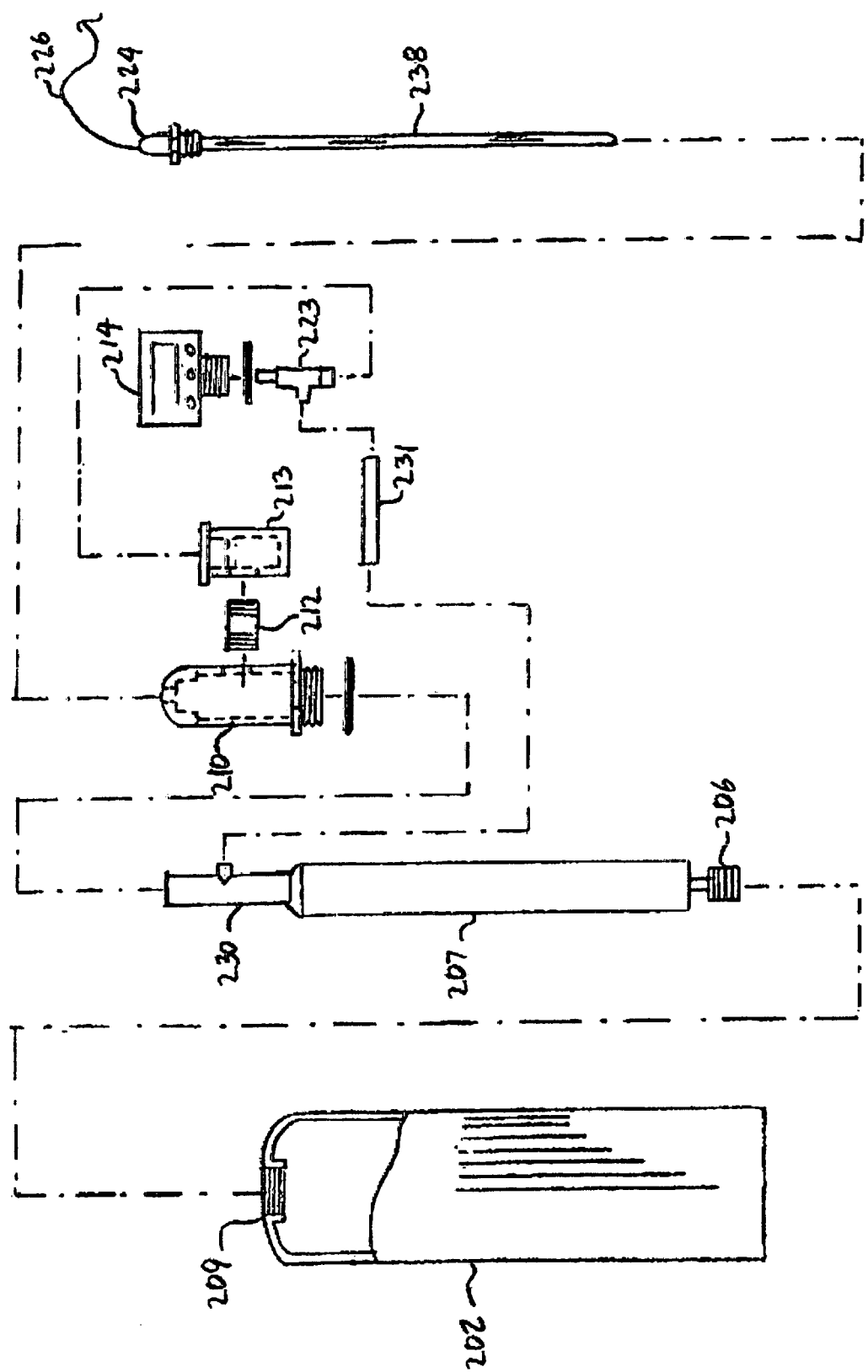
FIG. 15 is an exploded side view illustrating assembly of a treatment system according to the embodiment illustrated in FIG. 13.

FIG. 15 is an exploded side view illustrating assembly of a treatment system according to the embodiment illustrated in FIG. 13. This example shows the pressure vessel 202 partially cut away to show the opening 209. As described above, the pressure vessel 202 also contains a granular filter media bed that is not visible in this view. During installation of treatment system 201, flow transfer tube 207 is placed into pressure vessel 202 through opening 209 at the top of pressure vessel 202. When flow transfer tube 207 is properly positioned in pressure vessel 202, the top 230 of flow transfer tube 207 extends from pressure vessel 202.

Once the flow transfer tube 207 is placed into the pressure vessel 202, filter media 203, 204 and 205 are successively poured through the top opening of pressure vessel 202, filling the bottom portion of the pressure vessel. Coupling 210 may then be placed over flow transfer tube 207 and secured to pressure vessel 202. As shown here, the coupling 210 may be secured to the pressure vessel 202 via screw threads in the opening 209 of the pressure vessel 202 and bottom of the coupling 210. In such a case, the coupling 210 may be secured to the pressure vessel 202 by threading and tightening the coupling 210 into the opening 209 of the pressure vessel 202, compressing an O-ring 234 for a watertight seal.

The pipe fitting 212 may then be secured to the annular opening in the side of the coupling 210. The pipe fitting 212 may be threaded into the coupling 210 or affixed by other means. Once the pipe fitting 212 is secured to the coupling 210, the connector pipe 231 may be inserted through the pipe fitting 212 and into the coupling 210 to be secured to the annular opening in the side of the top end 230 of the flow transfer tube 207. The connector pipe 231 may be secured to the flow transfer tune 207 by other means.

Once the connector pipe 231 is secured to the flow transfer tube 207, the control valve receptacle 213 may be secured to the pipe fitting 212. As shown here, the pipe fitting 212 and control valve receptacle 213 may be threaded or may be joined by other means. The interconnection pipe 223 may then be placed into control valve receptacle 213 and secured to connector pipe 231. As noted above, connector pipe 231 may be made of PVC pipe. Further, interconnection pipe 223 may also be made of PVC and the parts joined using adhesives. Alternatively, other materials and means for joining the parts are also contemplated.

Control valve assembly 214 may then be mounted onto control valve receptacle 213. The control valve assembly 214 may be secured to control valve receptacle 213 by threads in the control valve receptacle 213 and on the control valve assembly 214 or by other means such as adhesives. The control valve assembly 214 may then be connected to an electrical power supply and the appropriate plumbing such as an untreated water supply, treated water outlet, drain and/or chemical supply line as discussed above.

Finally, ultraviolet lamp assembly 238 is placed through the annular opening in the top of the coupling 210 and into the flow transfer tube 207. The ultraviolet lamp assembly 238 may then be secured to the coupling 210 via threads on the connector 224 or other means. The ultraviolet lamp assembly 238 may then be electrically connected to an appropriate electrical power source. As noted above, the ultraviolet lamp assembly 238 may be removed from the treatment system 201 to replace the ultraviolet lamp periodically. That is, the system 201 may be depressurized and the ultraviolet lamp assembly 238 removed via connector 224 through the annular opening in the top of the coupling 210 without further disassembly of the coupling 210 or system 201.

The various preferred embodiments and variations thereof illustrated in the accompanying Figures and/or described above are merely exemplary and are not meant to limit the scope of the invention. It is to be appreciated that numerous variations of the invention have been contemplated as would be obvious to one of ordinary skill in the art with the benefit of this disclosure. All variations of the cover that read upon the appended claims are intended and contemplated to be within the scope of the invention.

What is claimed is:

1. A water treatment system comprising:
  a cylindrical pressure vessel defining an opening at one end of the vessel;
  a flow transfer tube centrally positioned within the pressure vessel, extending through the opening in the pressure vessel, and defining a cylindrical opening in a side of the flow transfer tube near an end of the tube extending from the pressure vessel, the cylindrical opening adapted to receive and sealably engage a connector pipe;
  a bed of granular filter media within the pressure vessel and substantially surrounding at least a portion of the flow transfer tube;
  an ultraviolet lamp assembly disposed within the flow transfer tube;
  a coupling adapted to receive and retain the flow transfer tube and ultraviolet lamp assembly, sealably engaging an end of the flow transfer tube and an end of the ultraviolet lamp assembly, and defining a cylindrical opening in a side of the coupling into the cylindrical cavity of the coupling, a pipe fitting sealably engaging said cylindrical opening, and a connector pipe extending through the pipe fitting and sealably engaging the cylindrical opening in the side of the flow transfer tube;
  a filter media retainer sealably engaging the bottom end of the flow transfer tube opposite the end engaging the coupling, the filter media retainer nozzle adapted to prevent filter media from entering the flow transfer tube, while allowing water to flow freely in either direction through openings in the retainer; and
  a flow control valve sealably connected to the end of the pipe fitting opposite the end engaging the coupling and to the end of the connector pipe opposite the end engaging the flow transfer tube, and adapted to control water flow through the flow transfer tube and pressure vessel.

2. The water treatment system of claim 1, further comprising one or more centralizer screens disposed within the flow transfer tube, the centralizer screen perforated to allow water to flow through the screen and defining a central opening adapted to slidably receive the ultraviolet lamp assembly and position and support the ultraviolet lamp assembly substantially centered within the flow transfer tube.

3. A coupling for a cylindrical pressure vessel of a water treatment system, the pressure vessel defining an opening at one end of the vessel and containing a bed of filter media, the coupling comprising:
  a coupling body adapted to sealably engage the opening in the pressure vessel, the coupling body defining a cylindrical cavity extending from an end of the coupling body engaging the opening in the pressure vessel, a cylindrical opening into the cylindrical cavity in an end of the coupling body opposite the end of the coupling body engaging the opening in the pressure vessel, and a cylindrical opening in a side of the coupling body into the cylindrical cavity;
  a flow transfer tube sealably engaging the coupling body in the cylindrical cavity around the cylindrical opening into the cylindrical cavity in an end of the coupling body opposite the end of the coupling body, the flow transfer tube extending through the cylindrical cavity of the coupling body, the opening in the pressure vessel, and into the filter media, the flow transfer tube further defining a cylindrical opening in a side of the flow transfer tube near an end of the tube inside the cylindrical cavity of the coupling body;

an ultraviolet lamp assembly disposed within the flow transfer tube and sealably engaging the cylindrical opening in the end of the coupling body opposite the end of the coupling body engaging the opening in the pressure vessel;

a pipe fitting sealably engaging the cylindrical opening in the side of the coupling body;

a connector pipe extending through the pipe fitting and sealably engaging the cylindrical opening in the side of the flow transfer tube; and a flow control valve sealably connected to the end of the pipe fitting opposite the end engaging the coupling and to the end of the connector pipe opposite the end engaging the flow transfer tube, and adapted to control water flow through the flow transfer tube and pressure vessel.

4. The coupling of claim 3, wherein the ultraviolet lamp assembly comprises:

an ultraviolet lamp;

a transparent lamp sleeve surrounding the ultraviolet lamp to prevent water in the flow transfer tube from contacting the ultraviolet lamp;

an end connector sealably engaging an end of the transparent lamp sleeve and adapted to engage the coupling; and an electrical conductor connected with the ultraviolet lamp and extending through the transparent lamp sleeve and end connector.

5. The coupling of claim 3, further comprising one or more centralizer screens disposed within the flow transfer tube, the centralizer screen perforated to allow water to flow through the screen and defining a central opening adapted to slidably receive the ultraviolet lamp assembly and position and support the ultraviolet lamp assembly substantially centered within the flow transfer tube.

6. The coupling of claim 3, further comprising a filter media retainer nozzle sealably engaging the bottom end of the flow transfer tube opposite the end engaging the coupling, the filter media retainer nozzle adapted to prevent filter media from entering the flow transfer tube, while allowing water to flow freely in either direction through openings in the retainer.

* * * * *